Figure 1:
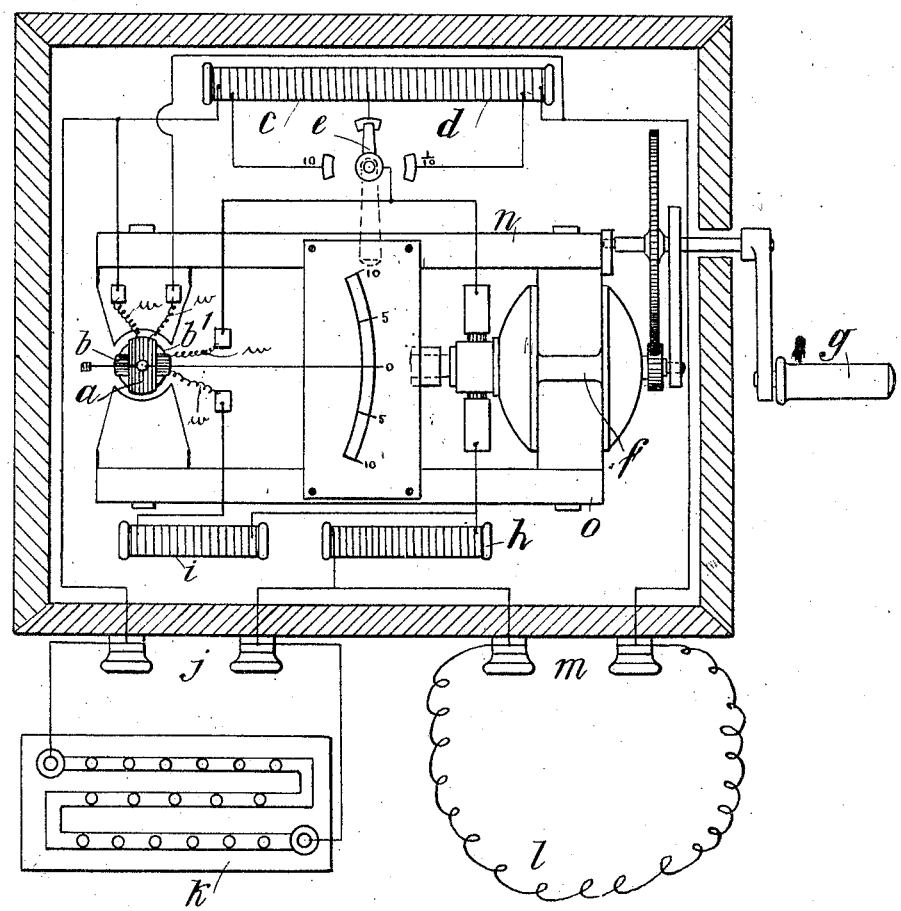

No. 858,335. PATENTED JUNE 25, 1907
S. EVERSHED.
APPARATUS FOR MEASURING ELECTRICAL RESISTANCES.
APPLICATION FILED FEB. 28, 1906.

4 SHEETS—SHEET 1

WITNESSES
W. P. Burke

INVENTOR
Sydney Evershed
BY Richardson
ATTYS.

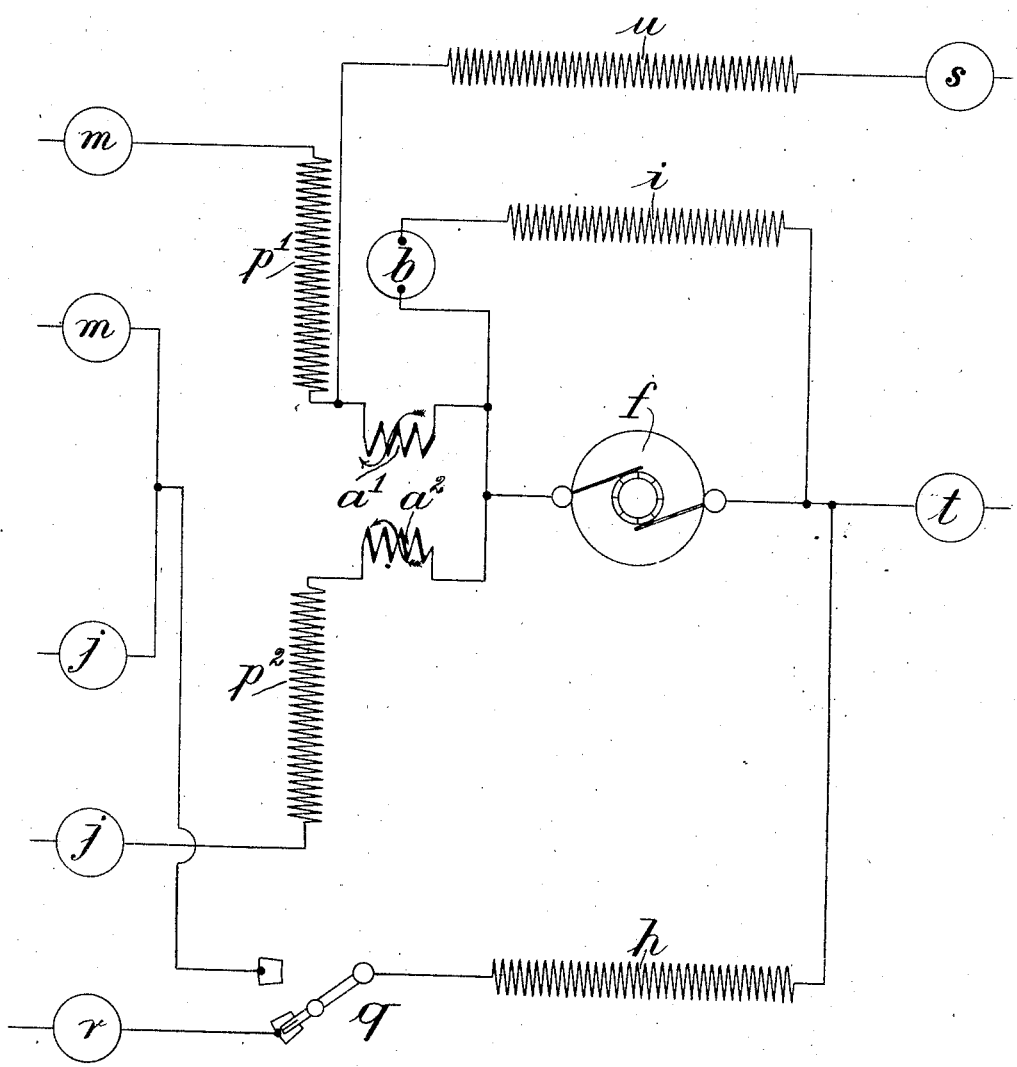
Fig.: 2A.

UNITED STATES PATENT OFFICE.

SYDNEY EVERSHED, OF CHISWICK, ENGLAND, ASSIGNOR TO HIMSELF, AND EVERSHED AND VIGNOLES LIMITED, OF CHISWICK, ENGLAND, A CORPORATION OF GREAT BRITAIN AND IRELAND.

APPARATUS FOR MEASURING ELECTRICAL RESISTANCES.

No. 858,335.

Specification of Letters Patent.

Patented June 25, 1907.

Application filed February 28, 1906. Serial No. 303,555.

*To all whom it may concern:*

Be it known that I, SYDNEY EVERSHED, a subject of the King of Great Britain and Ireland, residing at Chiswick, county of Middlesex, England, have invented new and useful Improvements in Apparatus for Measuring Electrical Resistances, of which the following is a specification.

This invention relates to galvanometers, ohmmeters and resistance boxes or rheostats, and its objects are to facilitate the rapid measurement of resistances, by means of a coil controlled galvanometer and any suitable ohm-reading rheostat, and to enable tests for the location of faults in electric circuits to be carried out by means of a high voltage with necessarily high resistances, which will reduce interference from stray currents and electromotive forces to a minimum.

My invention may be usefully applied to most of the usual resistance tests and is specially applicable to the resistance and fault-location tests required on telegraph and telephone circuits.

To carry out my invention tests of conductor resistance may be made on the Wheatstone bridge principle or by the differential galvanometer method or other known principle, but in all cases, I use an improved form of galvanometer made on the same principle as a two-coil ohmmeter; that is to say with one coil performing the same function as the coil in an ordinary bridge galvanometer or as the coils of a differential galvanometer, and with the other coil acting as the controlling force for the movable system. A current for the control coil is derived from the same source as that employed for the currents in the bridge or in the differential circuits as the case may be.

With my improved galvanometer it is not necessary to employ constant sources of current, and according to my invention I provide a suitable hand dynamo for providing the necessary testing current. The dynamo is wound to give a much higher voltage than is commonly employed to testing conductor resistance, and a high resistance is inserted in the armature circuit of the dynamo, so as to limit the current produced to a convenient and approximately constant value, no matter what value of resistance may be under test. Thus, I obtain substantially the same sensibility for all tests throughout a wide range of resistances. The irregular current due to unsteady rotation of the hand dynamo, has no effect on the steadiness of the galvanometer deflection, since both the working coils and the control coil are affected to an equal degree.

My improved galvanometer and high-voltage high-resistance hand dynamo may be employed to great advantage in locating the position of faults on telegraph and other circuits by means of any of the well-known loop tests. The difficulties often met with, in carrying out such tests, owing to earth currents and powerful currents straying from electric-tramway lines, are almost entirely eliminated by the very high resistance I am able to insert in my dynamo circuit. For example I may wind my dynamo to give 200 volts, and with this voltage the resistance in the dynamo circuit may be as much as 10000 ohms; with such a voltage and resistance, stray currents are reduced to a nearly negligible value.

Figure 2:
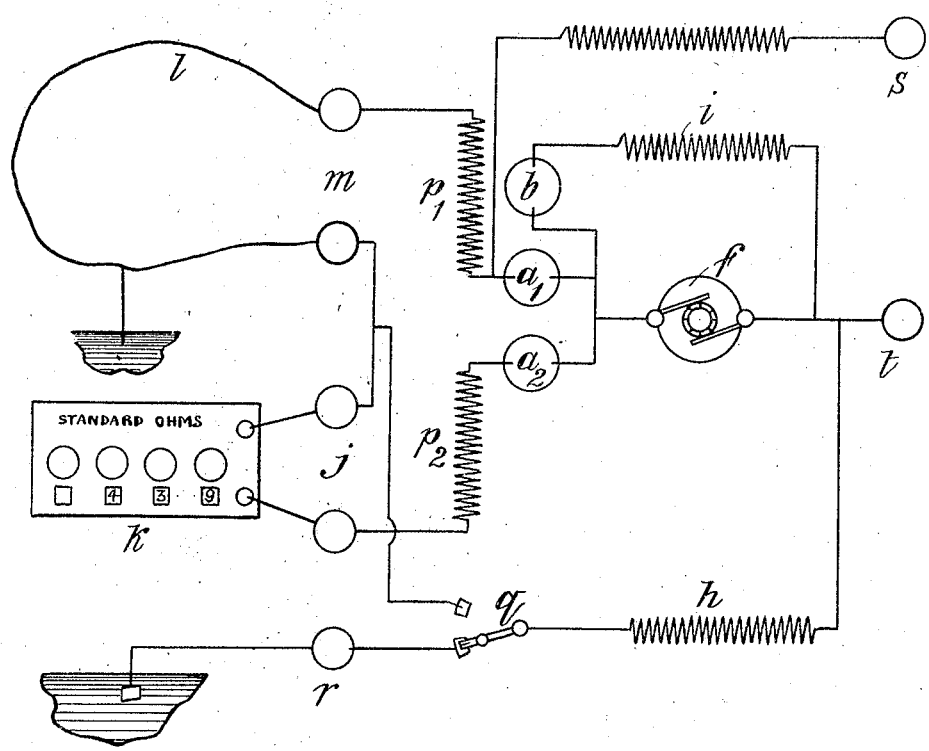
Figure 3:
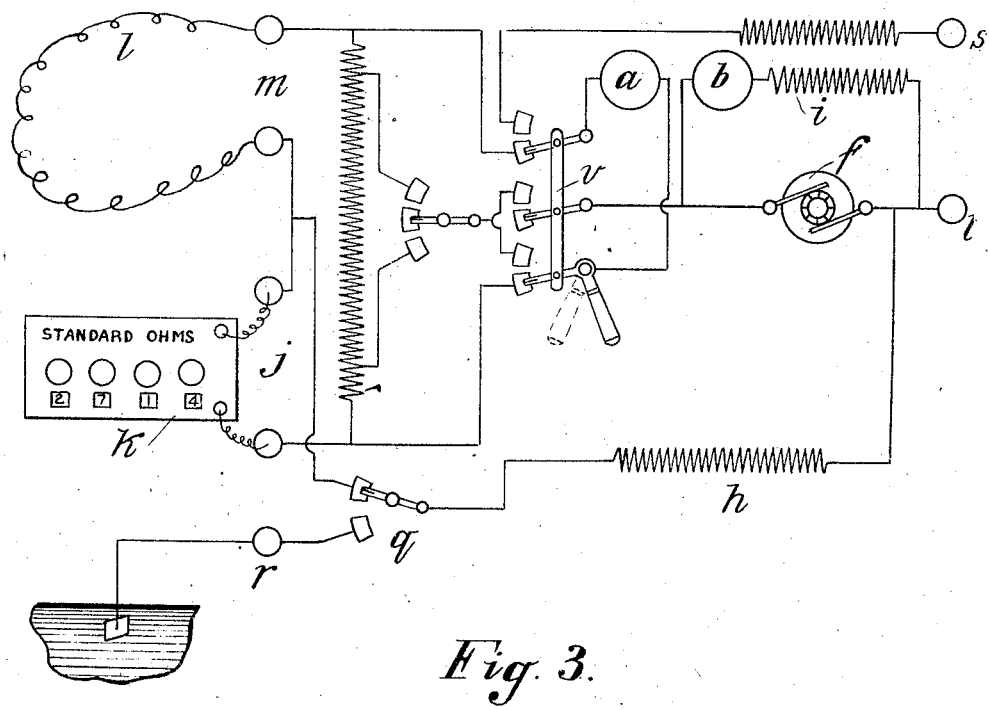

In order that my invention may be the better understood, I will now describe it with reference to the accompanying drawings, of which Figure 1 shows my coil-controlled galvanometer fitted inside a portable box with a hand dynamo and the necessary coils and connections for Wheatstone bridge testing. Fig. 2 is a diagram of my coil controlled galvanometer arranged for working by the differential method and provided with alternative connections for insulation testing. Fig. 2ª is a diagram of my coil controlled galvanometer showing certain terminals disconnected and other two terminals connected. Fig. 3 is a diagram of my coil controlled galvanometer and hand dynamo arranged for testing conductor resistances by the Wheatstone bridge method, and fitted with a switch for converting the galvanometer into a direct reading ohmmeter for testing insulation resistances.

In Fig 1, $a$ is the working coil of a moving coil galvanometer and $b$ is the control coil which is fixed upon the same axis as $a$, but with its magnetic axis at right angles to it.

Resistance coils $c$ and $d$ form the ratio arms of the Wheatstone bridge, and I show a switch $e$ for changing the ratio so as to enable a wide range of resistances to be measured. Current for testing is provided by a hand dynamo $f$ operated by a winch handle $g$ through the medium of suitable gearing. The dynamo may conveniently be wound to give a high voltage and to reduce the current to a convenient value, I insert a high resistance $h$ in the armature circuit. When the dynamo is wound to give as much as 200 volts the resistance $h$ may be as much as 10000 or 20000 ohms. The control coil $b$ is connected to the terminals of the dynamo, a resistance $i$ being inserted in its circuit adapted to reduce the current through the control coil to a suitable value.

Two pairs of terminals are provided; to one pair $j$ a suitable adjustable resistance box $k$ is to be connected, while the resistance to be tested, $l$ is connected to terminals $m$. The current is led in and out of the working coil and the control coil by means of flexible conductors $w$.

The magnetic field for the dynamo and the moving coil galvanometer may be conveniently provided by a pair of permanent magnets $n$ $o$, but I do not confine myself to this arrangement.

In Fig. 2, I show the working coil of my galvanometer wound differentially in two parts $a^1$ and $a^2$ as shown in Fig. 2$^a$, and since these coils have, almost necessarily, a winding of copper wire, I provide a resistance $p^1$ and $p^2$ in series with them, constructed of wire having a negligible temperature variation, so that the exact equality of the differential coils may be preserved independently of temperature. In this diagram I show connections for locating a leak on the loop $l$; the switch $q$ enables one pole of the dynamo to be connected to an earth terminal $r$ and so to earth, so that the usual method for ascertaining the position of the leak, namely by adding resistance to one end of the loop $l$ until the leak occupies the center of the circuit formed by the loop and the rheostat, may be carried out. I also show additional terminals $s$ and $t$ which may be used for carrying out insulation testing as shown in Fig. 2$^a$; coil $a^1$ then serving as a current coil of an ohmmeter, and coil $b$ as the pressure coil, it being understood of course that while the insulation testing is being carried out the terminals $m$, $j$ and $r$ are disconnected. A suitable resistance $u$ is inserted between the coil $a^1$ and the terminal $s$.

In Fig. 3, I show my coil controlled galvanometer adapted for working on the Wheatstone bridge principle, and fitted with a 3-pole 2-way switch $v$ which enables the working coil of the galvanometer to be disconnected from the bridge and connected to the terminal $s$. At the same time, the dynamo is disconnected from the bridge and connected to the other terminal of the working coil, thus converting the galvanometer into a 2-coil ohmmeter, and enabling the insulation of any circuit connected to the terminals $s$ and $t$ to be measured by direct reading on the scale of the galvanometer. When my coil controlled galvanometer is to be used in this way, I provide a suitable scale of ohms and megohms so that the reading of insulation resistance may be direct; the infinity point of the ohm scale is then used as the zero or fiducial mark of the galvanometer scale.

My apparatus may be employed for testing all ordinary resistances, and owing to my galvanometer being made dead-beat there is no difficulty in measuring circuits having moderate self induction or capacity but where it is desired to measure the resistance of a circuit having a very large time-constant, as for example, the field coil of a dynamo, I use a hand dynamo adapted to provide a constant electro-motive force and a perfectly steady current.

When tests are to be made with my improved apparatus, the operator turns the handle of the dynamo with one hand, and while watching the deflection of the galvanometer he is able to adjust the rheostat with the other hand and effect an accurate balance with far greater rapidity than by any of the means heretofore available.

Having now described my invention what I claim and desire to secure by Letters Patent is:—

1. Apparatus for measuring resistance consisting of in combination, a hand dynamo, a Wheatstone bridge, a resistance box, a line of which the resistance is to be tested, and a coil controlled galvanometer in which the control coil is directly connected between the two poles of a dynamo, the working coil being connected to opposite points of the Wheatstone bridge, a single pole of the dynamo being divided between the resistance box and the line to be measured, coming back to the Wheatstone bridge and the working coil of the galvanometer, and thence passing to the other pole of the dynamo.

2. In combination, a hand dynamo, a Wheatstone bridge, and a coil controlled galvanometer, in which the control coil is connected between the two poles of the said dynamo, and the working coil is connected to either end of the said Wheatstone bridge.

3. In apparatus for locating faults, in combination, a high voltage dynamo of high resistance, a Wheatstone bridge and a dead beat coil controlled galvanometer, in which the control coil is connected to the two poles of the said dynamo, and the working coil of the galvanometer is connected to either end of the said Wheatstone bridge.

4. In combination, a hand dynamo, and a coil controlled galvanometer, the control coil being connected between two poles of the dynamo, the working coil composed of two differentially wound coils, the connection of these coils being distinct from the connections to the control coil, receiving a charge from one pole divided between the resistance box and the line to be tested, while the return is from the line between the two said resistances back to the other pole of the dynamo.

In testimony whereof I have signed my name to this specification in the presence of two subscribing witnesses.

SYDNEY EVERSHED.

Witnesses:
 RICHARD A. HOFFMANN,
 CHARLES CARTER.